(12) United States Patent
Hara et al.

(10) Patent No.: US 8,161,841 B2
(45) Date of Patent: Apr. 24, 2012

(54) CABLE OPERATING MECHANISM

(75) Inventors: Nobukatsu Hara, Izumlsano (JP); Katsuyuki Ikebata, Izumi (JP); Takeshi Takachi, Kawachinagano (JP)

(73) Assignee: Shimano Inc., Osaka (JP)

( * ) Notice: Subject to any disclaimer, the term of this patent is extended or adjusted under 35 U.S.C. 154(b) by 622 days.

(21) Appl. No.: 12/274,595

(22) Filed: Nov. 20, 2008

(65) Prior Publication Data

US 2009/0090209 A1    Apr. 9, 2009

(51) Int. Cl.
*F16C 1/12*    (2006.01)
(52) U.S. Cl. ........................................ 74/502.2
(58) Field of Classification Search ................ 74/500.5, 74/501.6, 502.2
See application file for complete search history.

(56) References Cited

U.S. PATENT DOCUMENTS

| | | | | |
|---|---|---|---|---|
| 558,588 A | * | 4/1896 | Rose | ............................. 74/508 |
| 5,197,927 A | | 3/1993 | Patterson et al. | |
| 5,361,645 A | * | 11/1994 | Feng et al. | ................... 74/502.2 |
| 5,682,794 A | | 11/1997 | SHibata | |
| 6,595,894 B2 | | 7/2003 | Hanatani | |
| 7,290,462 B2 | | 11/2007 | Hou | |
| 7,628,095 B2 | * | 12/2009 | Funai | ........................... 74/502.2 |

FOREIGN PATENT DOCUMENTS

EP    1762484 A2    6/2006
FR    2 530 573 A1    1/1984

* cited by examiner

*Primary Examiner* — Vicky Johnson
(74) *Attorney, Agent, or Firm* — Global IP Counselors, LLP (57) ABSTRACT

A cable operating mechanism basically has a fixed member, a wire take-up member, an operating lever and a movement transmission arrangement. The wire takeup member is rotatably mounted with respect to the fixed member in first and second rotational directions with the second rotational direction being opposite the first rotational direction. The operating lever is pivotally mounted in the first rotational direction with respect to the fixed member. The movement transmission arrangement is operatively coupling the operating lever to the wire takeup member to transmit pivotal movement of the operating lever to rotational movement the wire takeup member such that the wire takeup member has a greater amount of angular displacement than an angular displacement of the operating lever in response to pivotal movement of the operating lever in the first rotational direction.

19 Claims, 8 Drawing Sheets

FIG. 15

CABLE OPERATING MECHANISM

BACKGROUND OF THE INVENTION

1. Field of the Invention

This invention generally relates to a cable operating mechanism. More specifically, the present invention relates to a cable operating mechanism for a cable operated bicycle device with an operating lever that pulls and/or releases a greater amount of a control wire relative to an amount of angular displacement of the operating lever.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets or gears. The sprockets or gears are usually coupled to the front crank and the rear wheel such that a pedaling force from the rider is transferred to the rear wheel via the chain.

Generally speaking, a typical derailleur basically includes a base member, a pair of link members and a movable member with a chain guide. In the case of a rear derailleur, the chain guide is typically pivotally mounted to the movable member and includes a chain cage with a guide pulley and a tension pulley. In either case, the link members of the front or rear derailleur are pivotally coupled between the base member and the movable member to form a four bar parallelogram linkage. A shift cable is usually coupled between the base member and one of the link members to move the chain guide laterally with respect to the center plane of the bicycle. Thus, an inner wire of the cable is pulled to move the chain guide in a first lateral direction with respect to the center plane of the bicycle, and released to move the chain guide in a second lateral direction with respect to the center plane of the bicycle.

Some cable operated shifters use one or more levers to rotate a wire takeup member for winding and releasing the inner wire that operates the derailleur. In many cases, the inner wire is wrapped or unwrapped about a peripheral edge of the wire takeup member. In such cases, during a winding or pulling operation, the winder lever is rotated to rotate the wire takeup member. Usually, the amount of angular displacement of the wire takeup member is nearly equally to the amount of angular displacement of the winder lever. Thus, in order to operate the derailleur, the rider may be required to rotate the winder lever a larger amount in order to pull the inner wire of the shift cable for the required amount to perform and complete a shift operation.

In view of the above, there exists a need for a bicycle shift operating device which overcomes the above mentioned problems in the prior art. This invention addresses this need in the art as well as other needs, which will become apparent to those skilled in the art from this disclosure.

SUMMARY OF THE INVENTION

One object of the present invention is to provide a cable operating mechanism that pulls and/or releases a greater amount of a control wire relative to an amount of angular displacement of the operating lever.

Another object of the present invention is to provide a bicycle shift operating device that is relatively simple and inexpensive to manufacture and assemble.

The foregoing objects can basically be attained by providing a cable operating mechanism basically has a fixed member, a wire take-up member, an operating lever and a movement transmission arrangement. The wire takeup member is rotatably mounted with respect to the fixed member in first and second rotational directions with the second rotational direction being opposite the first rotational direction. The operating lever is pivotally mounted in the first rotational direction with respect to the fixed member. The movement transmission arrangement is operatively coupling the operating lever to the wire takeup member to transmit pivotal movement of the operating lever to rotational movement the wire takeup member such that the wire takeup member has a greater amount of angular displacement than an angular displacement of the operating lever in response to pivotal movement of the operating lever in the first rotational direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
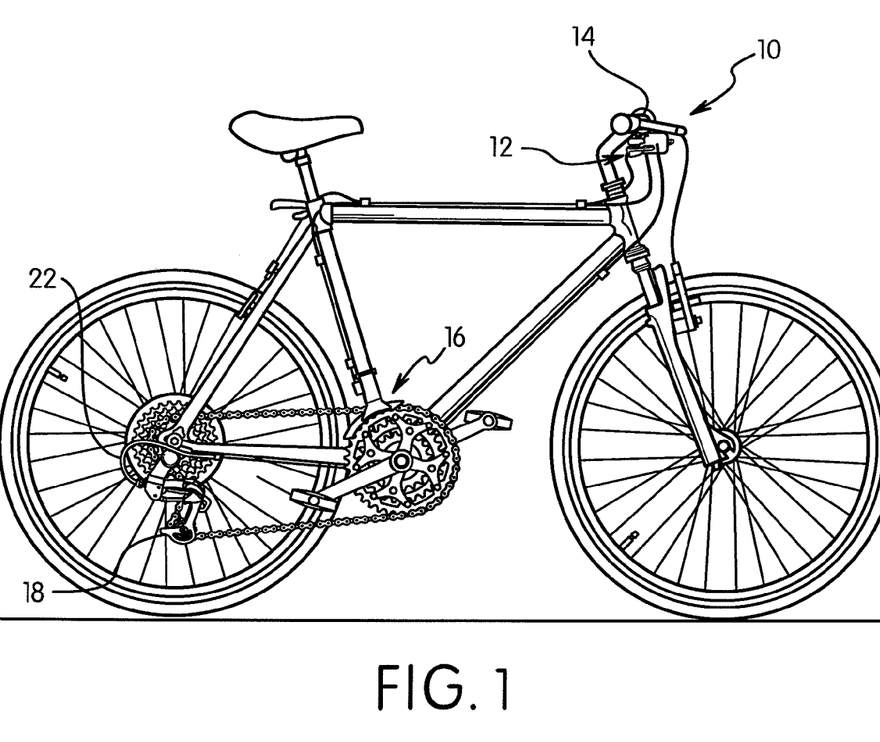
FIG. 1 is a side elevational view of a bicycle equipped with a bicycle control or cable operating mechanism in accordance with one embodiment.
Figure 2:
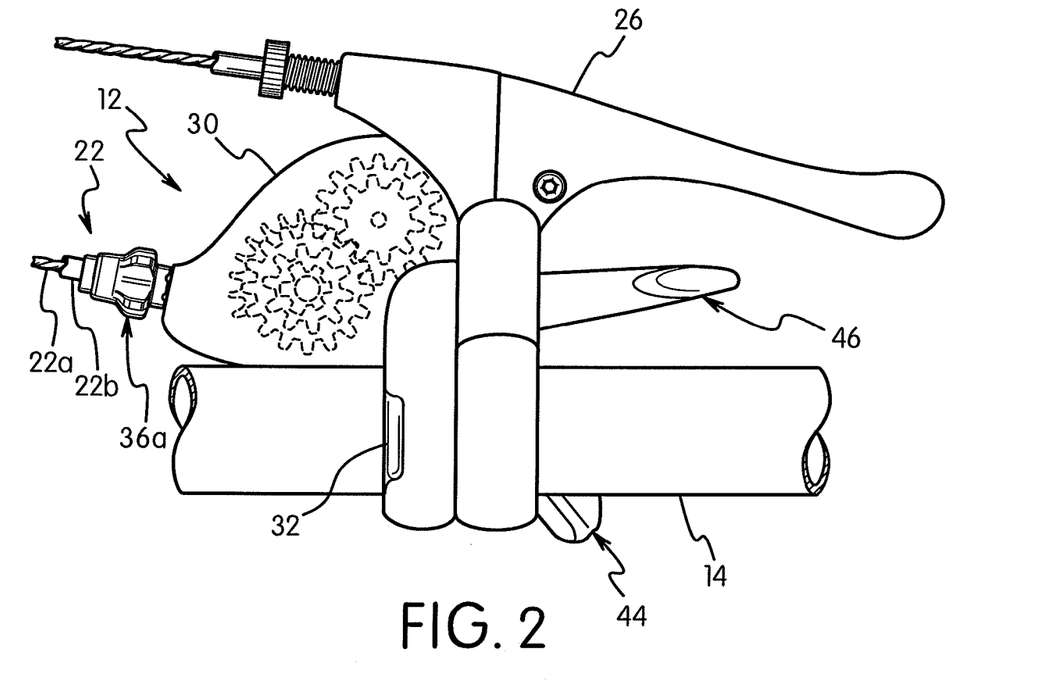
FIG. 2 is a top plan view of the bicycle control or cable operating mechanism mounted to a handlebar of the bicycle.

Referring initially to FIGS. 1 and 2, a bicycle 10 is illustrated equipped with a bicycle shift operating (control) device 12 in accordance with one embodiment. The bicycle shift operating (control) device 12 constitutes a cable operating mechanism that is preferably used for shifting gears of the bicycle 10. The bicycle shift operating device 12 is mounted on a handlebar 14. In the illustrated embodiment, the bicycle 10 is equipped with a various conventional components, including, but not limited to, a front derailleur 16 and a rear derailleur 18, which are examples of parts of a conventional bicycle drive train. The bicycle shift operating device 12 is a right hand side control device operated by the rider's right hand. Alternatively, the bicycle shift operating device 12 can be mounted on the other side of the handlebar 14 as needed and/or desired.

A shift operating cable 22 operatively connects the bicycle shift operating device 12 to the rear derailleur 18. Preferably, the operating cable 22 is a conventional bicycle control cable that an inner wire 22a with an outer casing 22b covering the inner wire 22a. The rear derailleur 18 can be moved between a plurality (nine) of different gear positions by operation of the bicycle shift operating device 12, which selectively pulls or releases the inner wire 22a of the shift operating cable 22.

As seen in FIG. 2, the bicycle shift operating device 12 is mounted on the handlebar 14 closely adjacent to a brake lever 26 and located on the inward side of the brake lever 26. Preferably, the bicycle shift operating device 12 has a housing 30 for covering the internal parts and a handlebar clamp or bracket 32 for securing the bicycle shift operating device 12 to the handlebar 14. The handlebar clamp 32 is preferably made of, for example, metal and configured to be fastened to the handlebar 14 by tightening a bolt.

Figure 3:
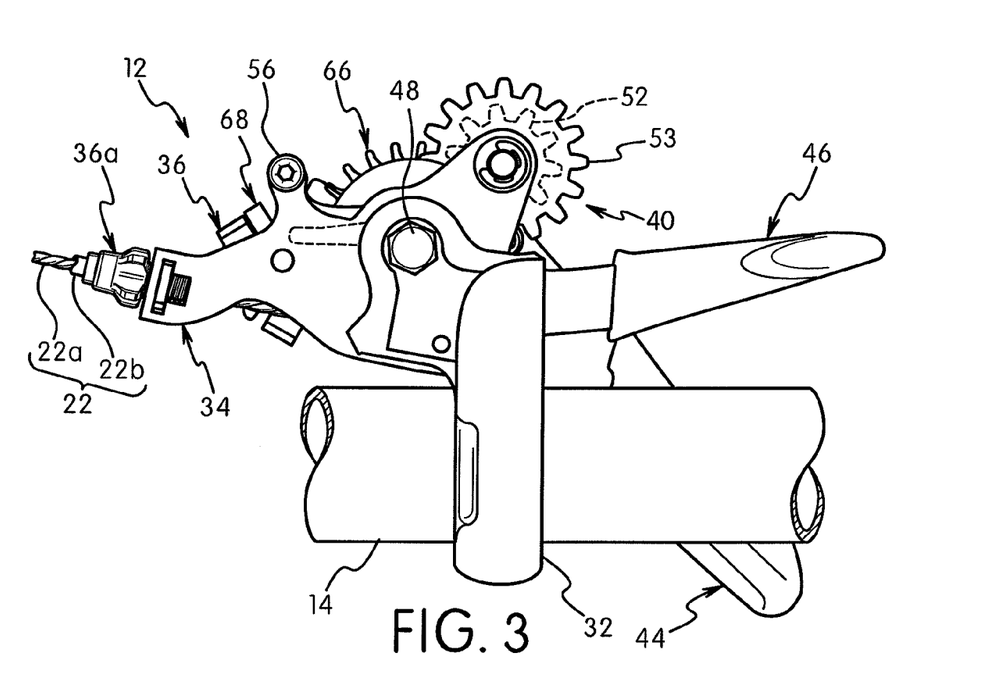
FIG. 3 is a top plan view of the bicycle control or cable operating mechanism illustrated in FIG. 2 with the housing removed.
Figure 4:
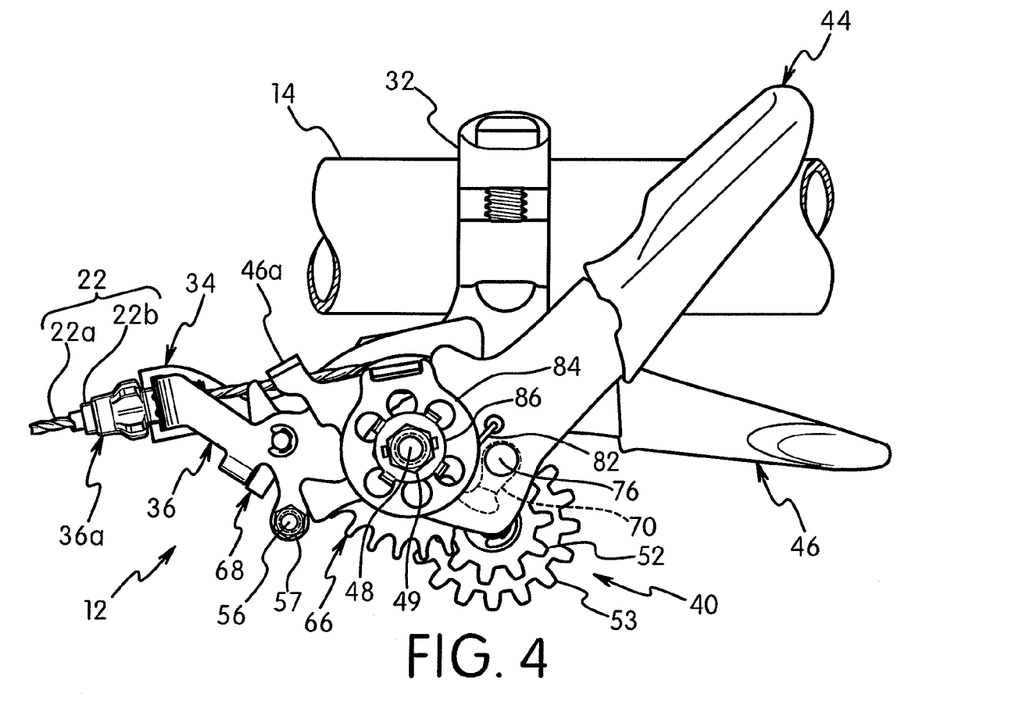
FIG. 4 is a bottom plan view of the bicycle control or cable operating mechanism illustrated in FIGS. 2 and 3 with the housing removed.
Figure 5:
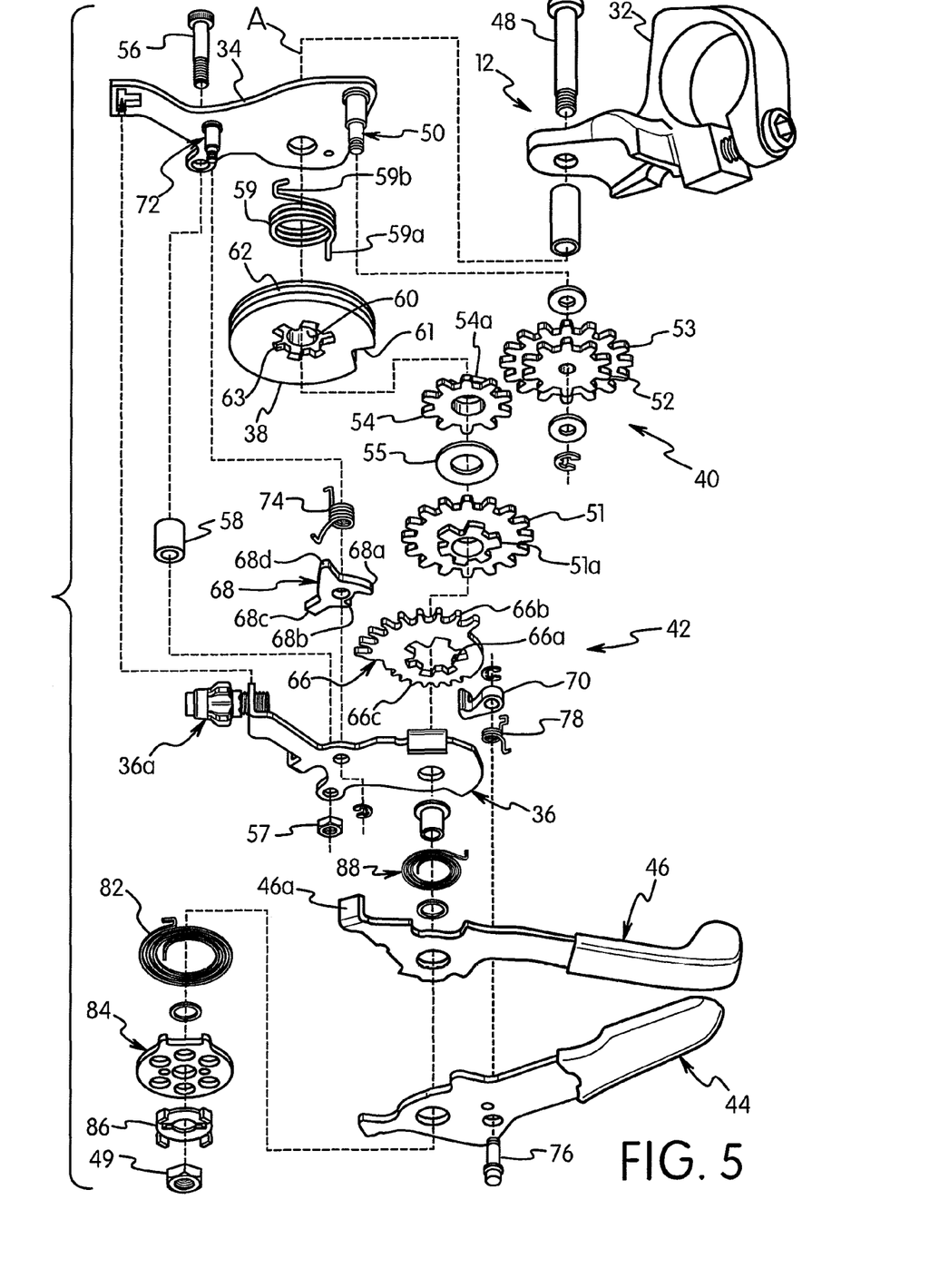
FIG. 5 is a simple exploded perspective view of selected part of the bicycle control or cable operating mechanism in accordance with the illustrated embodiment.

As shown in FIGS. 3 to 5, the bicycle shift operating device 12 basically includes an upper support plate 34, a lower support plate 36, a wire takeup member 38, a movement transmission arrangement 40, a shift positioning mechanism 42, a wire winding (operating) lever 44, a wire release (operating) lever 46 and a main support shaft 48. The housing 30, the handlebar clamp 32 and the support plates 34 and 36 basically constitute a support or fixed member of the bicycle shift operating device 12 (i.e., the cable operating mechanism). Basically, the wire winding lever 44 constitutes a winding or pulling member of the cable operating mechanism and the wire release lever 46 constitutes a releasing member of the cable operating mechanism.

The support plates 34 and 36 are secured together by the main support shaft 48, which is preferably a bolt with a nut 49 threaded on its lower end. Preferably, the main support shaft 48 extends perpendicular to the support plates 34 and 36. The main support shaft 48 defines a main pivot or rotational axis A of the wire takeup member 38, the shift positioning mechanism 42, the wire winding lever 44 and the wire release lever 46. In other words, wire takeup member 38, the shift positioning mechanism 42, the wire winding lever 44 and the wire release lever 46 are all movably mounted with respect to the fixed member (e.g., the housing 30, the handlebar clamp 32 and the support plates 34 and 36) on a single coincident axis corresponding to the axis A.

Basically, the movement transmission arrangement 40 operatively couples the wire winding (operating) lever 44 to the wire takeup member 38 via the shift positioning mechanism 42. The movement transmission arrangement 40 transmits pivotal movement of the wire winding (operating) lever 44 to rotational movement the wire takeup member 38 such that the wire takeup member 38 has a greater amount of angular displacement than an angular displacement of the wire winding (operating) lever 44 in response to pivotal movement of the wire winding (operating) lever 44 in a first (winding) rotational direction R1. Preferably, the movement transmission arrangement 40 is operatively disposed between the wire takeup member 38 and the shift positioning mechanism 42 and positioned along the rotational axis A of the wire takeup member 38. In particular, the movement transmission arrangement 40 is basically supported between the support plates 34 and 36 by the main support shaft 48 and a support pin 50 that is fixed to the upper support plate 34.

Figure 8:
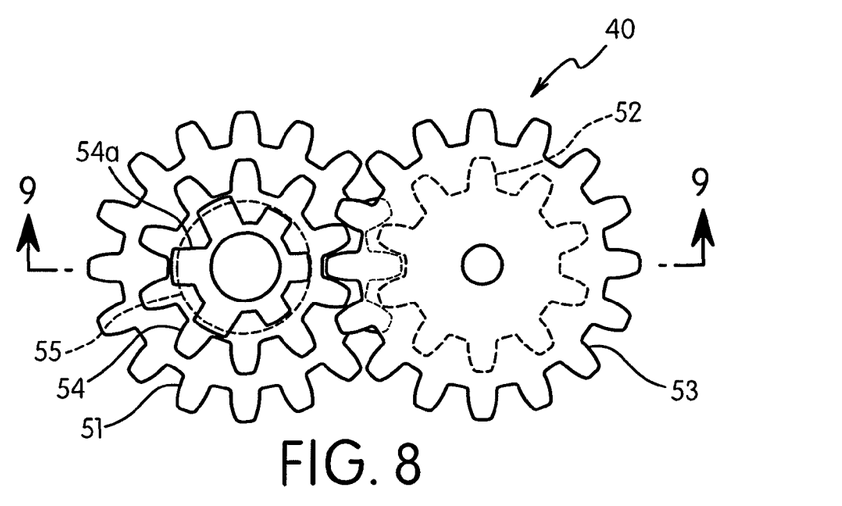
FIG. 8 is a top plan view of the movement transmission arrangement for the cable operating mechanism.
Figure 9:
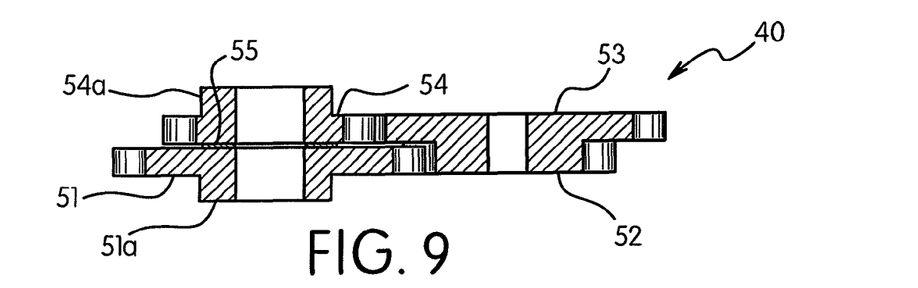
FIG. 9 is a cross sectional view of the movement transmission arrangement as seen along section line 9-9 of FIG. 8.

As seen in FIGS. 5, 8 and 9, the movement transmission arrangement 40 basically includes a first gear 51, a second gear 52, a third gear 53 and a fourth gear 54. The first and fourth gears 51 and 54 are rotatably mounted on the main support shaft 48. The second and third gears 52 and 53 are rotatably mounted on the support pin 50. The first gear 51 is fixed to rotate with the wire winding (operating) lever 44 via the shift positioning mechanism 42. The second gear 52 has its teeth meshed with the teeth of the first gear. The third gear 53 rotated by the second gear 52. In particular, the second and third gears 52 and 53 are fixed together such that the second and third gears 52 and 53 rotate together as a single integrated unit. In the illustrated embodiment, the second and third gears 52 and 53 are integrally formed as a one-piece, unitary member. The first and fourth gears 51 and 54 are rotatably mounted on the main support shaft 48 with a washer 55 axially separating the first and fourth gears 51 and 54 along the main support shaft 48. The fourth gear 54 has its teeth meshed with the teeth of the third gear 53. The fourth gear 54 is fixed to rotate with the wire takeup member 38.

In this illustrated embodiment, the first and third gears 51 and 53 are identical in diameter and the number of teeth. The second and fourth gears 52 and 54 are identical in diameter and the number of teeth. Thus, in the illustrated embodiment, the first and second gears 51 and 52 have a gear ratio that is equal to a gear ratio between the third and fourth gears 53 and 54. In particular, the second gear 52 rotates 1.6 times for each rotation of the first gear 51. Likewise, the fourth gear 54 rotates 1.6 times for each rotation of the third gear 53. Accordingly, the fourth gear 54 rotates 2.56 times for each rotation of the first gear 51.

Referring back to FIG. 5, the support plates 34 and 36 are also secured together by a bolt 56 and a nut 57. The shaft of the bolt 56 is provided with a spacer 58 for holding the support plates 34 and 36 apart at the appropriate spacing. Thus, the support plates 34 and 36 are mounted on the main support shaft 48 for supporting the shift positioning mechanism 42 on the main support shaft 48.

The lower support plate 36 is preferably provided with a cable adjusting nut 36a for receiving the shift operating cable 22. The cable adjusting nut 36a guides the inner wire 22a of the shift operating cable 22 to the shift positioning mechanism 42. The cable adjusting nut 36a is a conventional structure, and thus, it will not be discussed and/or illustrated in detail.

The wire takeup member 38 is movably mounted with respect to the fixed member (e.g., parts 30, 32, 34 and 36) of the bicycle shift operating device 12 by the main support shaft 48. In particular, the wire takeup member 38 is pivotally mounted on the main support shaft 48 such that the wire takeup member 38 can move in both a wire winding direction for pulling the inner wire 22a of the shift operating cable 22 and a wire releasing direction for releasing the inner wire 22a of the shift operating cable 22. Preferably, the wire takeup member 38 is preferably a hard rigid member formed of a suitable rigid material such as a hard plastic material.

Figure 6:
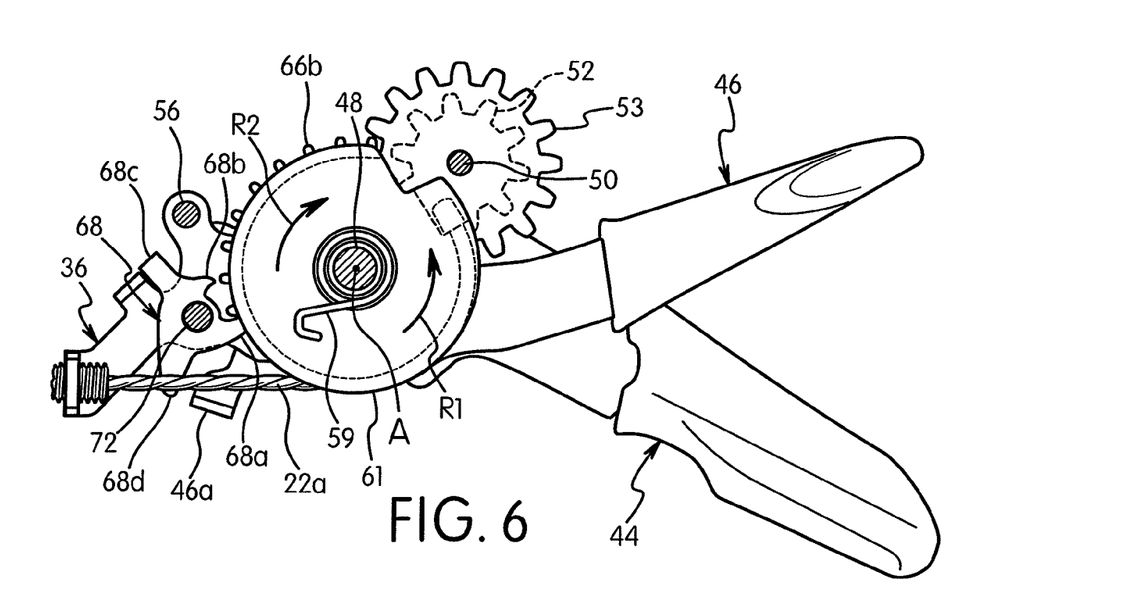
FIG. 6 is a top plan view of selected parts of the cable operating mechanism shown in a neutral or rest position with the wire takeup member and the movement transmission member in the fully released position.
Figure 7:
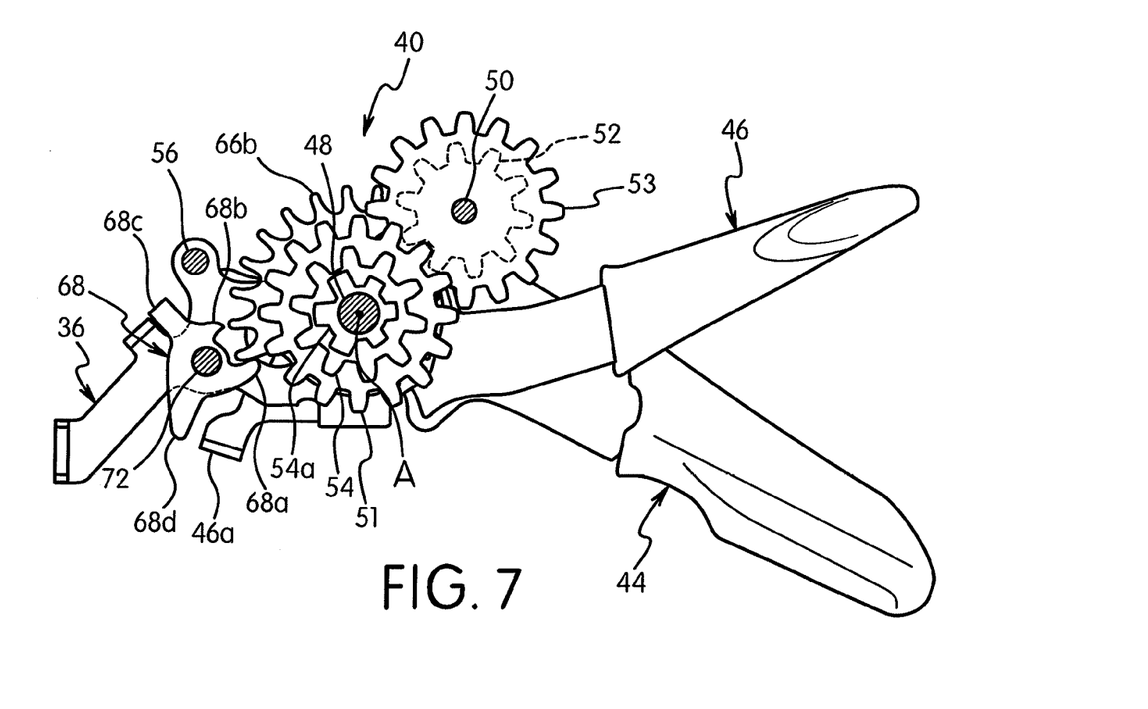
FIG. 7 is a top plan view, similar to FIG. 6, of selected parts of the cable operating mechanism but with the wire takeup member removed.

As best seen in FIGS. 5 and 6, a spring member 59 (e.g., a torsional coil spring) is provided between the support plate 34 and the wire takeup member 38 to spring load the wire takeup member 38 in the wire releasing direction (i.e., clockwise in FIG. 6). In particular, a first end 59a of the spring member 59 is disposed in a hole in the wire takeup member 38 and a second end 59b is hooked into a hole in the upper support plate 34. Thus, the biasing force of the spring member 59 causes the wire takeup member 38 to rotate about the pivot axis A during a wire releasing operation. Also, the rear derailleur 18 is typically provided with a biasing member that also applies a pulling force on the inner wire 22a which in turn urges the wire takeup member 38 in a second rotational (wire releasing) direction R2 (i.e., clockwise in FIG. 6).

The wire takeup member 38 includes a center hole 60 for receiving the main support shaft 48, a wire attachment structure 61 for attaching the inner wire 22a, and a winding groove 62 for receiving inner wire 22a during a winding or pulling operation. As seen in FIG. 5, the bottom surface of the wire takeup member 38 is provided with a non-circular recess 63 that surrounds the center hole 60. The non-circular recess 63 mates with a non-circular projecting part 54a of the fourth gear 54 of the movement transmission arrangement 40 such that the wire takeup member 38 moves integrally as a unit with the fourth gear 54. The upper surface of the wire takeup member 38 is provided with a concentric groove around the center hole 60 for receiving the spring member 59.

Referring to FIG. 5, the shift positioning mechanism 42 basically includes a positioning element or plate 66, a position maintaining element or pawl 68, and a winding element or pawl 70. Generally speaking, the shift positioning mechanism 42 is operatively coupled between the wire takeup member 38 and the lever 44 and 46 to selectively maintain the wire takeup member 38 in one of the plurality of predetermined wire positions. More specifically, the wire winding lever 44 is operatively coupled to the positioning plate 66 of the shift positioning mechanism 42 by the winding pawl 70 such that pivotal movement of the wire winding lever 44 in the first rotational direction R1 (i.e., counterclockwise in FIGS. 10 to 15) causes the wire takeup member 38 to rotate in the first rotational direction R1 (i.e., counterclockwise in FIGS. 10 to 15) from a current shift position to a subsequent shift position with the shift positioning mechanism 42 holding the wire takeup member 38 in the subsequent shift position. The wire release lever 46 is operatively coupled to the position maintaining pawl 68 of the shift positioning mechanism 42 such that movement of the wire release lever 46 in the second rotational direction R2 (i.e., clockwise in FIGS. 10 to 15) causes the wire takeup member 38 to rotate (i.e., clockwise in FIGS. 10 to 15) from a current shift position to a subsequent shift position with the shift positioning mechanism 42 holding the wire takeup member 38 in the subsequent shift position.

The positioning plate 66 is rotatably mounted between the upper and lower support plates 34 and 36 by the main support shaft 48 to rotate about the axis A between a plurality of predetermined wire positions. The positioning plate 66 is a ratchet plate that has an non-circular engaging hole 66a that mates with a non-circular projecting part 51a of the first gear 51 of the movement transmission arrangement 40 such that the positioning plate 66 moves integrally as a unit with the first gear 51.

The positioning plate 66 includes an outer peripheral edge with a plurality of positioning teeth 66b selectively engagable with the position maintaining pawl 68 and a plurality of winding teeth 66c selectively engagable with the winding pawl 70. The positioning teeth 66b and the winding teeth 66c are configured and arranged to form nine predetermined wire positions of the positioning plate 66 and the wire takeup member 38. The size of the spaces between adjacent pairs of the positioning teeth 66b is determined based on the amount of cable movement required to achieve the shift positions of the rear derailleur 18.

As best seen in FIGS. 10 to 15, the position maintaining pawl 68 is pivotally mounted between the upper and lower support plates 34 and 36 by a pivot shaft 72. The pivot shaft 72 protrudes from the bottom surface of the upper support plate 34. The position maintaining pawl 68 is spring loaded by a spring member 74 (e.g., a torsional coil spring) in the counterclockwise direction of FIGS. 10 to 15. Thus, the position maintaining pawl 68 is movably arranged with respect to the upper and lower support plates 34 and 36 to move between a position holding state (FIGS. 10, 12, 13 and 15) that holds the positioning plate 66 in one of the predetermined wire positions and a position releasing state (FIGS. 11 and 14) that releases the positioning plate 66 for rotational movement of the positioning plate 66.

Preferably, the position maintaining pawl 68 has a stop tooth 68a, an over-rotation preventing tooth 68b, a stop projection 68c and an actuating projection 68d. Generally speaking, the stop tooth 68a and the over-rotation preventing tooth 68b selectively and alternately engage one of the positioning teeth 66b in response to pivotal movement of the wire release lever 46. The stop projection 68c protrudes outwardly in a radial direction from an outer peripheral edge of the position maintaining pawl 68 for contacting an abutment on the lower support plate 36 to maintain the position maintaining pawl 68 in the position holding state or rest position. In particular, the spring member 74 urges the position maintaining pawl 68 in the counterclockwise direction of FIGS. 10 to 15 such that the stop projection 68c of the position maintaining pawl 68 contacts the abutment on the lower support plate 36 to maintain the position maintaining pawl 68 in the position holding state. The actuating projection 68d protrudes outwardly in a radial direction from an outer peripheral edge of the position maintaining pawl 68 such that the pivotal movement of the wire release lever 46 makes the wire release lever 46 contact the actuating projection 68d to rotate the position maintaining pawl 68 from the position holding state to the position releasing state.

Figure 10:
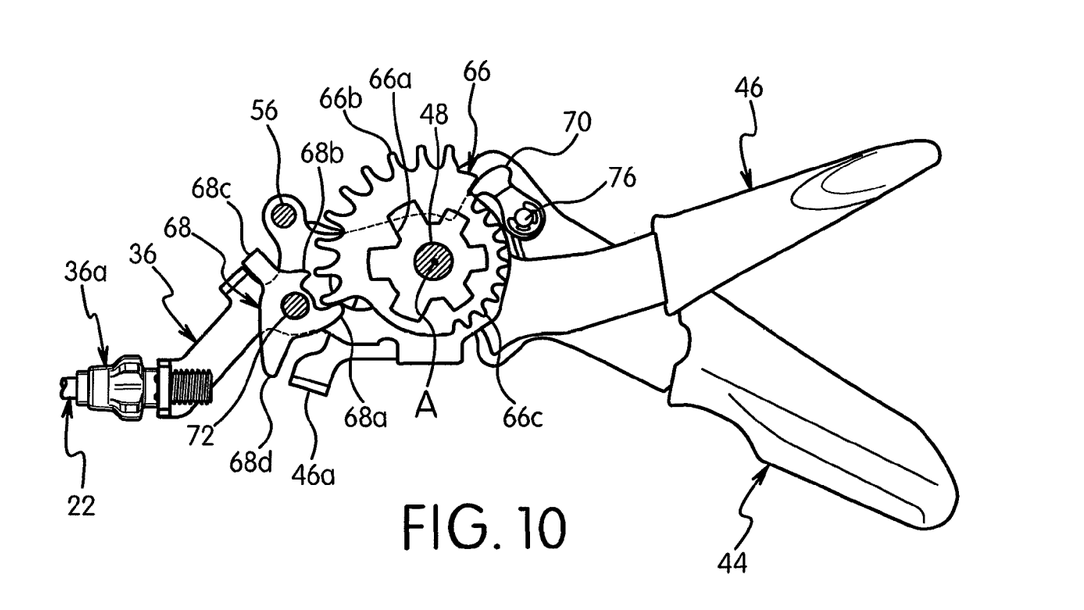
FIG. 10 is a top plan view of selected parts of the cable operating mechanism shown in a neutral or rest position with the wire takeup member and the movement transmission member removed.
Figure 11:
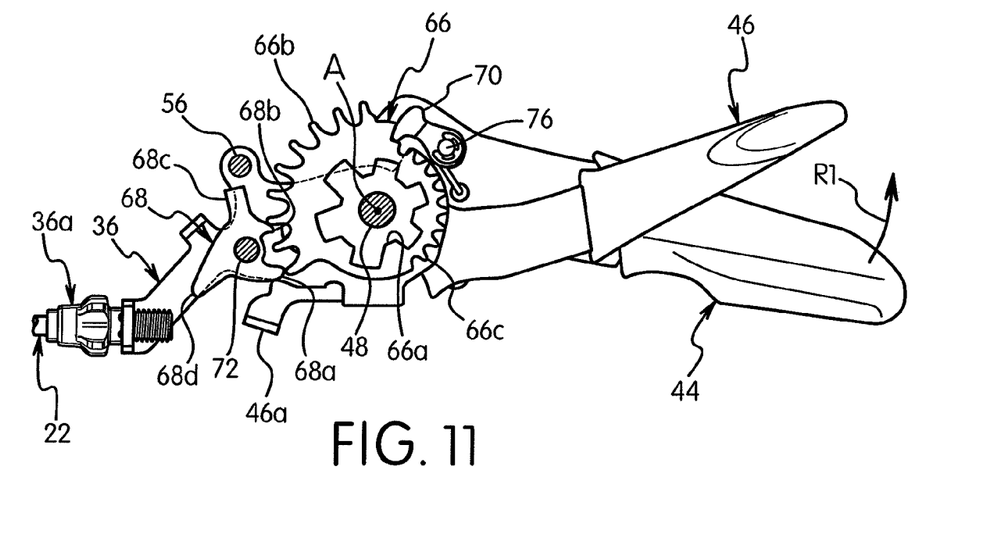
FIG. 11 is an enlarged top plan view, similar to FIG. 10, of selected parts of the cable operating mechanism illustrating the winding lever being moved to a wire pulled position during a shifting operation from the position of FIG. 9.
Figure 13:
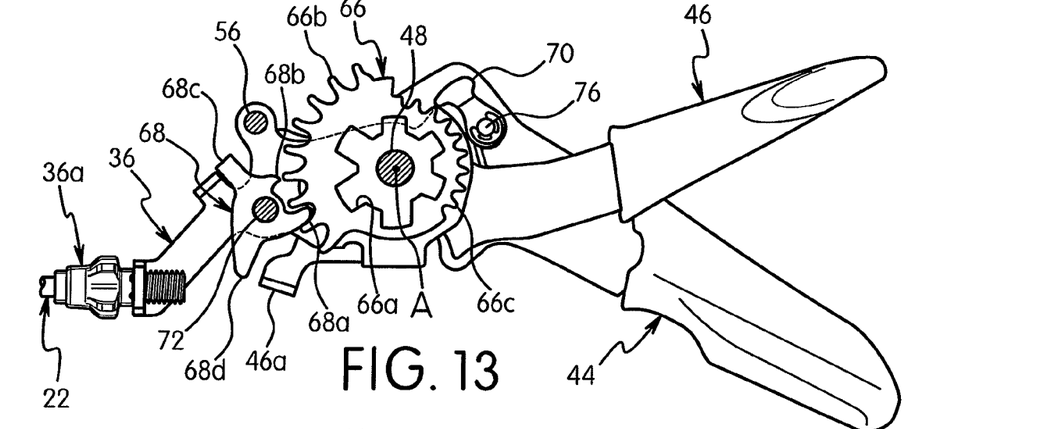
FIG. 13 is a top plan view of selected parts of the cable operating mechanism shown in a neutral or rest position with the wire takeup member and the movement transmission member removed.
Figure 14:
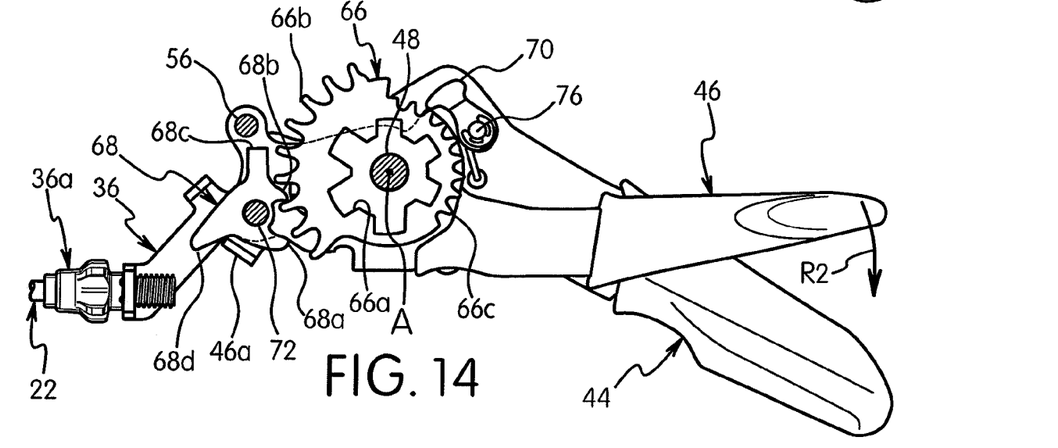
FIG. 14 is an enlarged top plan view, similar to FIG. 13, of selected parts of the cable operating mechanism illustrating the release lever being moved to a releasing position during a shifting operation from the position of FIG. 13.

The position maintaining pawl 68 moves in the same plane as the positioning plate 66 such that the stop tooth 68a and the over-rotation preventing tooth 68b selectively and alternately engages one of the positioning teeth 66b in response to pivotal movement of the wire release lever 46. In particular, with the wire release lever 46 in the rest position, the position maintaining pawl 68 is biased to the position holding state in which the stop tooth 68a engages one of the positioning teeth 66b and the over-rotation preventing tooth 68b is spaced from the positioning teeth 66b as seen in FIGS. 10, 12, 13 and 15. Thus, the stop tooth 68a of the position maintaining pawl 68 contacts one of the positioning teeth 66b to stop rotation of the positioning plate 66 (which is spring loaded in the counterclockwise direction of FIGS. 10 to 15) in the wire release direction. When the wire release lever 46 is moved from the rest position to the releasing position, the position maintaining pawl 68 is moved to the position releasing state in which the stop tooth 68a disengages from the positioning teeth 66b and the over-rotation preventing tooth 68b engages one of the positioning teeth 66b to temporality hold the positioning plate 66 in an intermediate position as seen in FIGS. 11 and 14. In other words, the over-rotation preventing tooth 68b is configured to move between a non-contact position where it does not contact one of the positioning teeth 66b and a contact position where it contacts one of the positioning teeth 66b at a different position than the stop tooth 68a during the wire releasing operation. When the over-rotation preventing tooth 68b moves to the contact position by the wire release lever 46, the over-rotation preventing tooth 68b contacts one of the positioning teeth 66b located one tooth downstream in the release direction from one of the positioning teeth 66b that the position maintaining pawl 68 was contacting, thereby preventing the positioning plate 66 from continuing to rotate in the wire release direction after the position maintaining pawl 68 separates from one of the positioning teeth 66b. When the over-rotation preventing tooth 68b is in the contact position, the stop tooth 68a of the position maintaining pawl 68 is arranged in a position located beyond one of the positioning teeth 66b that it was originally engaged with.

As seen in FIGS. 5 and 10 to 15, the winding pawl 70 is provided on the wire winding lever 44 such that movement of the wire winding lever 44 causes the winding pawl 70 to selectively engage one of the winding teeth 66c of the positioning plate 66 for rotating the positioning plate 66. Thus, the winding pawl 70 (e.g., a wire winding member) is movably mounted with respect to the fixed member to drive the positioning plate 66, the movement transmission arrangement 40 and the wire takeup member 38 in the first rotational (wire winding) direction R1. In particular, the winding pawl 70 is pivotally mounted on a pivot pin 76 that is fixed to the wire winding lever 44. Thus, the winding pawl 70 is movably arranged with respect to the wire winding lever 44 to move between a disengaged or rest position and a winding position. In the winding or pulling position, the tooth of the winding pawl 70 engages one of the winding teeth 66c. In the disengaged or rest position, the tooth of the winding pawl 70 is separated from the winding teeth 66c.

As seen in FIG. 5, a spring member 78 (e.g., a torsional coil spring) is provided on the pivot pin 76 with one end of the spring member 78 engaged with the wire winding lever 44 and the other end of the spring member 78 engaged with the winding pawl 70. The spring member 78 biases the winding pawl 70 towards the positioning plate 66. In other words, the winding pawl 70 is spring loaded in the counterclockwise direction in FIGS. 10 to 15 by the spring member 78. However, when the winding pawl 70 is in the rest position, the tooth of the winding pawl 70 rests on the edge of the lower support plate 36. When the wire winding lever 44 is moved in the first rotational direction (wire winding direction), the tooth of the winding pawl 70 rides off the edge of the lower support plate 36 to engage one of the winding teeth 66c. The number of positioning teeth 66b and the number of the winding teeth 66c corresponds to the number of shift positions of the rear derailleur 18 and the teeth 66b and 66c are configured to protrude radially outward from an external circumferential surface of the positioning plate 66. Together with the wire takeup member 38, the positioning plate 66 is spring loaded in the second rotational (wire releasing) direction R2 (i.e., clockwise from a top plan view) by the spring member 59.

As mentioned above, the wire winding lever 44 supports the winding pawl 70, which constitutes the wire winding member. Thus, the wire winding lever 44 is an operating member that has a cable pulling function for operating a typical gear changer device (e.g., the rear derailleur). As seen in FIGS. 10 and 11, the wire winding lever 44 is rotatably mounted on the main support shaft 48 such that it can pivot freely between a rest or start position shown in FIG. 10 and an operation end position by pivoting counterclockwise from the rest or start position. The wire winding lever 44 is operatively coupled to the shift positioning mechanism 42 to change a current position of the wire takeup member 38. The wire winding lever 44 is preferably a trigger lever that returns to a rest position after being moved to an operating position to change the current position of the wire takeup member 38. In particular, the wire winding lever 44 is spring loaded toward the rest position by a spring member 82 (e.g., a spiral spring). The spring member 82 has one end engaged with the wire winding lever 44 and the other end engaged with a retaining plate 84, which is provided on the end of the main support shaft 48 between the nut 49 and the wire winding lever 44. The retaining plate 84 contacts a flange of the lower support plate 36 to prevent rotation of the retaining plate 84 about the main support shaft 48. Preferably, a nut plate 86 is also provided on the end of the main support shaft 48 between the nut 49 and the retaining plate 84. The nut 49 is threaded on the lower end of the main support shaft 48 to retain the wire winding lever 44, the wire release lever 46, the retaining plate 84 and nut plate 86 on the main support shaft 48 below the lower support plate 36.

The wire release lever 46 is a wire releasing member that has a wire release function for operating a typical gear changer device (e.g., the rear derailleur 18). The wire release lever 46 is rotatably mounted on the main support shaft 48 with respect to the fixed member (e.g., parts 30, 32, 34 and 36). The wire release lever 46 is configured to engage the shift positioning mechanism 42 to release the wire takeup member 38 so that it can rotate due to the force of the spring member 59. Specifically, the wire release lever 46 has a movement transmitting protrusion or release abutment 46a that has been formed by bending a distal end of the wire release lever 46. The release abutment 46a is an integral part of the wire release lever 46, which is pivotally mounted on the pivot axis A. The release abutment 46a engages the actuating projection 68d of the position maintaining pawl 68 when the wire release lever 46 is pivoted from the rest position to the releasing position to release the wire takeup member 38 for rotation in under the urging force of the spring member 59.

Preferably, the wire release lever 46 is a trigger lever that returns to the rest position after being moved to the operating or releasing position to change the current position of the wire takeup member 38. In particular, the wire release lever 46 is spring loaded toward the rest position by a spring member 88 (e.g., a torsional coil spring), which has a first end coupled to the lower support (member) plate 36 and a second end coupled to the wire release lever 46.

The operation of the shift positioning mechanism 42 of bicycle shift operating device 12 in order to shift gears will now be explained with reference to FIGS. 10 to 12. First, an operation of pulling or winding the shift operating cable 22 will be explained.

Figure 12:
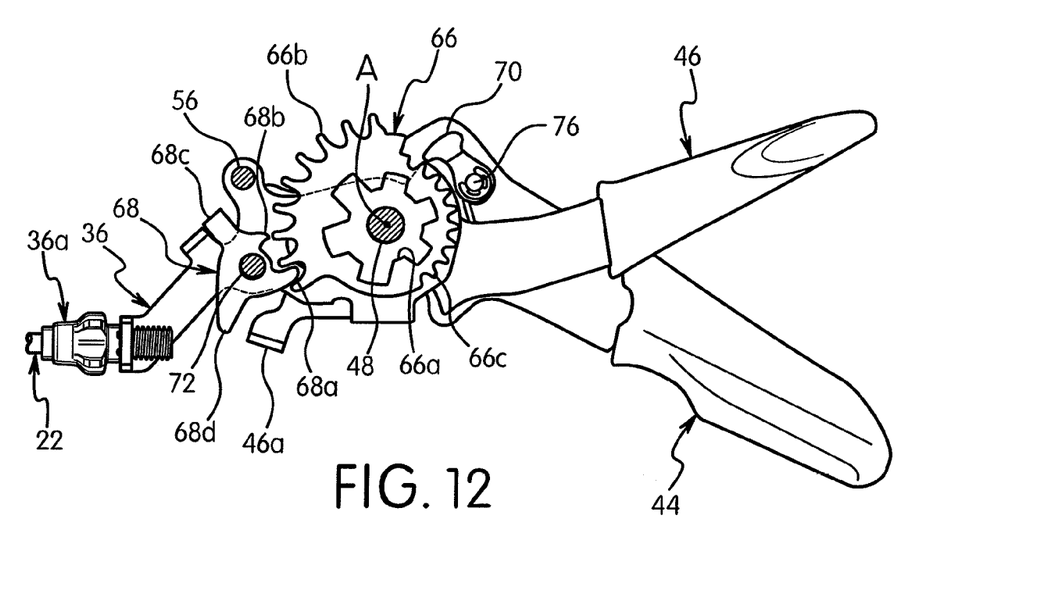
FIG. 12 is an enlarged top plan view, similar to FIGS. 10 and 11, of selected parts of the cable operating mechanism illustrating the winding lever returned to the neutral or rest position from the shifting operation of FIG. 11.

As shown in FIGS. 10 and 12, the rest position is shown in which neither the wire winding lever 44 nor the wire release lever 46 has been operated. In FIG. 10, the rear derailleur 18 is in a ninth (top) position, i.e., the position corresponding to the gear having the smallest tooth count, and the wire takeup member 38 is in the ninth predetermined wire position. If, from the state shown in FIG. 10, a rider presses the wire winding lever 44 with a right thumb and moves the wire winding lever 44, from the start or rest position toward the end position, then the winding pawl 70 will contact one of the winding teeth 66c of the positioning plate 66 and the positioning plate 66 and the movement transmission arrangement 40 will be pivoted together in the wire winding direction, i.e., the counterclockwise direction R1 of FIGS. 10 to 12. This pivotal movement of the positioning plate 66 also causes the movement transmission arrangement 40 to pivot the wire takeup member 38. The pivotal movement of the wire takeup member 38 causes the inner wire 22a to be pulled such that the rear derailleur 18 moves toward an intermediate position corresponding to a larger gear, i.e., a gear having a larger diameter. During this movement, as shown in FIG. 11, the position maintaining pawl 68 is moved by one of the positioning teeth 66b engaging the stop tooth 68a to rotate the position maintaining pawl 68 such that the position maintaining pawl 68 pivots in the clockwise direction. When the wire winding lever 44 has been pivoted towards the end position and released, the wire winding lever 44 returns to the start or rest position as shown in FIG. 12 due to the spring load of the spring member 82 and the positioning plate 66 is positioned due to the engagement of the position maintaining pawl 68 with the positioning teeth 66b.

Figure 15:
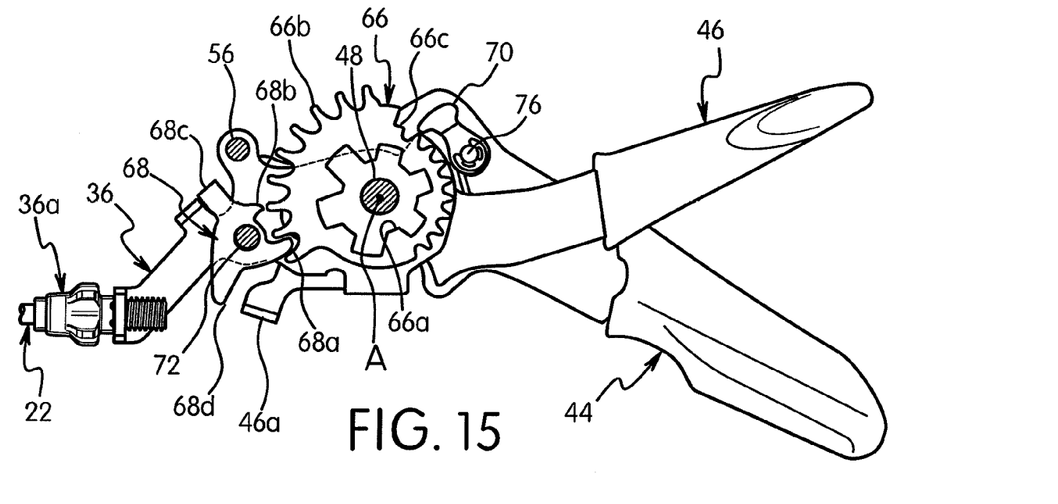
FIG. 15 is an enlarged top plan view, similar to FIGS. 13 and 14, of selected parts of the cable operating mechanism illustrating the release lever returned to the neutral or rest position after the shifting operation of FIG. 15.

Now an operation of releasing the shift operating cable 22 will be explained with reference to FIGS. 13 to 15. If, from the position shown in FIG. 13, the wire release lever 46 is moved the second rotational (clockwise) direction R2, this movement of the wire release lever 46 causes the release abutment 46a of the wire release lever 46 to contact the actuating projection 68d to rotate the position maintaining pawl 68 in a clockwise direction. As a result, the over-rotation preventing tooth 68b is moved in between two of the positioning teeth 66b to prevent the positioning plate 66 from rotating to far under the force of the spring member 59. Thus, when the position maintaining pawl 68 pivots clockwise, the stop tooth 68a of the position maintaining pawl 68 separates from one of the positioning teeth 66b and the positioning plate 66 rotates clockwise. This pivotal movement of the positioning plate 66 also causes the movement transmission arrangement 40 to pivot the wire takeup member 38. The pivotal movement of the wire takeup member 38 causes the inner wire 22a to be released such that the rear derailleur 18 moves to the next gear. When the positioning plate 66 rotates in the wire releasing direction, the over-rotation preventing tooth 68b of the position maintaining pawl 68 contacts one of the positioning teeth 66b located one tooth away from one of the positioning teeth 66b and the positioning plate 66 stops rotating. When the rider releases the wire release lever 46, the wire release lever 46 returns to the rest position as shown in FIG. 15 due to the spring force of the spring member 88. The position maintaining pawl 68 then rotates counterclockwise due to the spring member 74 and the over-rotation preventing tooth 68b separates from one of the positioning teeth 66b, causing the positioning plate 66 to rotate clockwise again. However, the stop tooth 68a of the position maintaining pawl 68 contacts the positioning teeth 66b and causes the positioning plate 66, the movement transmission arrangement 40 and the wire takeup member 38 to be positioned.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the cable operating mechanism. Accordingly, these terms, as utilized to describe the cable operating mechanism should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cable operating mechanism comprising:
   a fixed member;
   a wire takeup member rotatably mounted with respect to the fixed member in first and second rotational directions on a rotational axis with the second rotational direction being opposite the first rotational direction;
   an operating lever pivotally mounted with respect to the fixed member on a pivot axis that is parallel to the rotational axis; and
   a movement transmission arrangement operatively coupling the operating lever to the wire takeup member to transmit pivotal movement of the operating lever to rotational movement of the wire takeup member in the first rotational direction such that the wire takeup member has a greater amount of angular displacement than an angular displacement of the operating lever in response to the pivotal movement of the operating lever, the movement transmission arrangement including
a first gear fixed to rotate with the operating lever,
a second gear meshed with the first gear,
a third gear rotated by the second gear, and
a fourth gear meshed with the third gear, with the fourth gear being fixed to rotate with the wire take up member.

2. The cable operating mechanism according to claim 1, wherein
the second and third gears are fixed together such that the second and third gears rotate together as a single unit.

3. A cable operating mechanism comprising:
a fixed member;
a wire takeup member rotatably mounted with respect to the fixed member in first and second rotational directions with the second rotational direction being opposite the first rotational direction;
an operating lever pivotally mounted with respect to the fixed member; and
a movement transmission arrangement operatively coupling the operating lever to the wire take up member to transmit pivotal movement of the operating lever to rotational movement of the wire takeup member in the first rotational direction such that the wire takeup member has a greater amount of angular displacement than an angular displacement of the operating lever in response to pivotal movement of the operating lever,
the movement transmission arrangement including
a first gear fixed to rotate with the operating lever,
a second gear meshed with the first gear,
a third gear rotated by the second gear, and
a fourth gear meshed with the third gear, with the fourth gear being fixed to rotate with the wire takeup member,
the first and second gears having a gear ratio that is equal to a gear ratio between the third and fourth gears.

4. The cable operating mechanism according to claim 3, further comprising
a positioning member including a plurality of winding teeth that are selectively engaged with a winding pawl that is operatively mounted to the operating lever.

5. The cable operating mechanism according to claim 4, wherein
the movement transmission arrangement is disposed between the wire takeup member and the positioning member along a rotational axis of the wire takeup member.

6. The cable operating mechanism according to claim 4, wherein
the positioning member further includes a plurality of positioning teeth that are engaged with a positioning pawl to selectively maintain the positioning member in one of a plurality of predetermined wire positions.

7. The cable operating mechanism according to claim 6, further comprising
a wire releasing member movably mounted with respect to the fixed member, the wire releasing member including a release abutment that engages the positioning pawl to release the positioning member during a wire releasing operation of the wire releasing member.

8. A cable operating mechanism comprising:
a fixed member;
a wire takeup member rotatably mounted with respect to the fixed member in first and second rotational directions with the second rotational direction being opposite the first rotational direction;
an operating lever pivotally mounted in the first rotational direction with respect to the fixed member; and
a movement transmission arrangement operatively coupling the operating lever to the wire takeup member to transmit pivotal movement of the operating lever to rotational movement of the wire take up member such that the wire takeup member has a greater amount of angular displacement than an angular displacement of the operating lever in response to pivotal movement of the operating lever in the first rotational direction,
the wire takeup member and the operating lever being movably mounted with respect to the fixed member on a single coincident axis.

9. The cable operating mechanism according to claim 8, further comprising
a positioning member including a plurality of winding teeth that are selectively engaged with a winding pawl that is operatively mounted to the operating lever.

10. The cable operating mechanism according to claim 9, wherein
the positioning member further includes a plurality of positioning teeth that are engaged with a positioning pawl to selectively maintain the positioning member in one of a plurality of predetermined wire positions.

11. The cable operating mechanism according to claim 10, further comprising
a wire releasing member movably mounted with respect to the fixed member, the wire releasing member including a release abutment that engages the positioning pawl to release the positioning member during a wire releasing operation of the wire releasing member.

12. The cable operating mechanism according to claim 9, wherein
the movement transmission arrangement is disposed between the wire takeup member and the positioning member along a rotational axis of the wire takeup member.

13. A cable operating mechanism comprising:
a fixed member;
a wire takeup member rotatably mounted with respect to the fixed meniber first and second rotational directions on a rotational axis with the second rotational direction being opposite the first rotational direction;
an operating lever pivotally mounted with respect to tho fixed member on a pivot axis that is parallel to the rotational axis;
a movement transmission arrangement operativel coupling the operating lever to the wire takeup to transmit pivotal movement of the operating lever to rotational movement of the wire takeup member in the first rotational direction such that the wire takeup member has a greater amount of angular displacement than an angular displacement of the operating lever in response to the pivotal movement of the operating lever; and
a positioning member including a plurality of winding teeth that are selectively engaged with a winding pawl that is operatively mounted to the operating lever.

14. The cable operating mechanism according to claim 13, wherein
the positioning member further includes a plurality of positioning teeth that are engaged with a positioning pawl to selectively maintain the positioning member in one of a plurality of predetermined wire positions.

15. The cable operating mechanism according to claim 14, further comprising a wire releasing member movably mounted with respect to the fixed member, the wire releasing member including a release abutment that engages the positioning pawl to release the positioning member during a wire releasing operation of the wire releasing member.

16. The cable operating mechanism according to claim 13, wherein the movement transmission arrangement is disposed between the wire takeup member and the positioning member along a rotational axis of the wire takeup member.

17. A cable operating mechanism comprising:

a fixed member;

a wire takeup member rotatably mounted with respect to the fixed member in first and second rotational directions with the second rotational direction being opposite the first rotational direction;

an operating lever pivotally mounted with respect to the fixed member to move the wire takeup member in the first rotational direction;

a wire releasing member movably mounted with respect to the fixed member to move the wire takeup member in the second rotational direction;

a movement transmission arrangement operatively coupling the operating lever to the wire takeup member to transmit pivotal movement of the operating lever to rotational movement of the wire takeup member in the first rotational direction such that the wire takeup member has a greater amount of angular displacement than an angular displacement of the operating lever in response to the pivotal movement of the operating lever; and a shift positioning mechanism including a positioning member, a positioning pawl operatively engaging the positioning member in response to a wire releasing operation of the wire releasing member and a winding pawl operatively engaging the positioning member in response to a wire winding operation of the operating lever, the positioning pawl having a pivot axis that remains stationary with respect to the fixed member during the wire releasing operation of the wire releasing member.

18. The cable operating mechanism according to claim 17, wherein the movement transmission arrangement is disposed between the wire take up member and the positioning member along a rotational axis of the wire takeup member.

19. The cable operating mechanism according to claim 17, wherein the positioning member includes a plurality of winding teeth that are selectively engaged with the winding pawl that is operatively mounted to the operating lever, the positioning member further includes a plurality of positioning teeth that are engaged with the positioning pawl to selectively maintain the positioning member in one of a plurality of predetermined wire positions, and the wire releasing member includes a release abutment that engages the positioning pawl to release the positioning member during the wire releasing operation of the wire releasing member.

* * * * *